Figure 1:
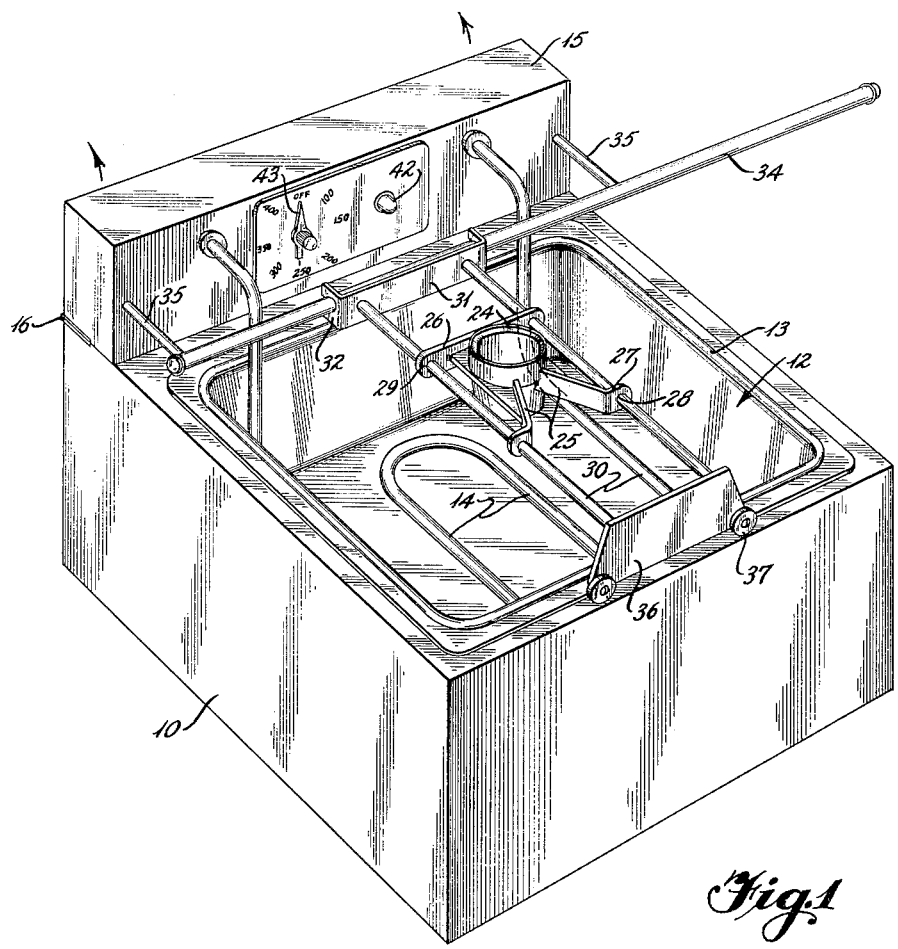

Sept. 12, 1961  P. A. BUCK ET AL  2,999,451
FRYER
Filed May 7, 1959  2 Sheets-Sheet 2
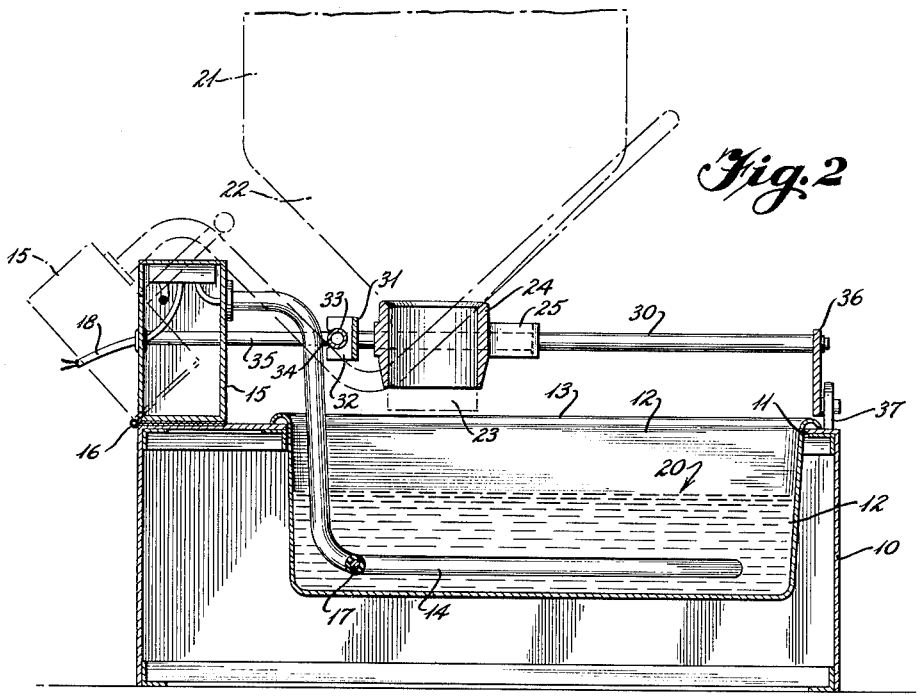
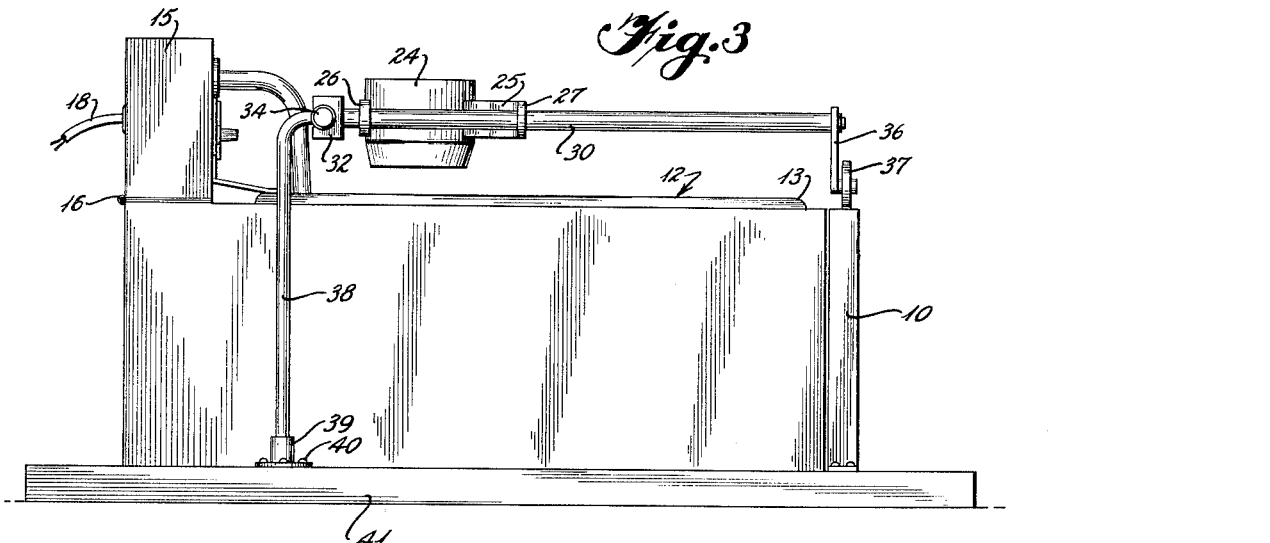
INVENTORS
PORTER A. BUCK &
RICHARD G. CRIST
BY
ATTORNEY

United States Patent Office 2,999,451
Patented Sept. 12, 1961

2,999,451
FRYER
Porter A. Buck, Rte. 1, Box 394, Maitland, Fla., and Richard G. Crist, 815 Madison Blvd., Orlando, Fla.
Filed May 7, 1959, Ser. No. 811,660
5 Claims. (Cl. 99—353)

This invention relates to material preparation or treatment and to the equipment utilized therein and which material preparation or treatment and equipment is employed in the production of commodities or end products of various kinds and for use for various purposes.

The invention relates particularly to the heating, cooling or temperature modification of matter, for example, in the preparation of foods, and to the equipment employed including pans or other containers, coils or other devices by which the temperature is modified, and other structures associated therewith.

Articles of equipment of various kinds have been utilized in the production of bakery products and the like, but these have been complicated, expensive, bulky and required excessive attention and time in the use thereof and were not durable and could not be easily cleaned or kept clean.

It is an object of the invention to provide relatively simple, inexpensive equipment for producing pastry products, such as doughnuts or the like, and which equipment includes a hopper or container for batter, a pan or receptacle in which the cooking is accomplished and simple means by which the pan or receptacle is heated and with the parts combined in such a manner that ready access can be had to the pans or receptacle.

Another object of the invention is to provide temperature modification equipment including a hollow base in which a pan or other receptacle is removably received and with a movable control header and associated heating element extending therefrom into the receptacle and with a hopper or container for material to be treated mounted for movement over the length and breadth of the pan or receptacle and from a position overlying to a position beyond the same in order to afford access thereto and make it easy to remove the product being treated, the temperature modification element, and if desired the container in which the treatment is being effected.

A further object of the invention is to provide a relatively simple device of the character indicated having a hollow base and with a removable well-forming receptacle, a header and heating element with the latter movable into and from said well to provide the necessary temperature modification for permitting the swinging of the header with the heating element from the well and with means for mounting a container for material so it can be disposed over said well or beyond the limits thereof to allow full access to said well.

Other objects and advantages of the invention will be apparent from the following description taken in conjunction with the accompanying drawings wherein:

FIG. 1 is a perspective illustrating one application of the invention;

FIG. 2, a section on the line 2—2 of FIG. 1;

FIG. 3, a side elevation of a slightly modified form of the invention.

Briefly stated, the invention is a structure for subjecting material to temperature modification and including cooking of articles such as doughnuts or the like in deep fat and comprises a hollow base with an opening in which is received a pan, vessel or receptacle having a marginal flange by which it is suspended in such opening in the base. The interior of the receptacle is adapted to be subjected to temperature modification either heating or cooling by means of a serpentine coil mounted on a header and extending into the receptacle. The header is hinged to the base so that the coil can be swung from the receptacle. Also mounted above the base is a support for a hopper in the form of a traverse rod which can be carried by the header or otherwise, said traverse rod being located adjacent the rear of the receptacle and being adapted to have slidably mounted thereon a yoke to which are connected parallel bars which extend forwardly, the outer ends of which are connected by an upright plate having rollers which are adapted to roll upon the upper front surface of the housing adjacent the front edge of the receptacle. Thus the support for the hopper can be moved over the length and breadth of the receptacle and beyond the side of the receptacle to afford access to the latter and when not over the receptacle the coil can be swung upwardly from the receptacle.

With continued reference to the drawings a hollow base 10 is provided having an opening 11 in which is supported a container or receptacle 12 having a flange 13 by which the receptacle is suspended within the base. The receptacle may be of any desired configuration such as rectangular as illustrated with its length disposed from side to side about the base and its width disposed from front to rear.

Articles to be subjected to temperature modification, such as dough or the like to be cooked are adapted to be disposed within the receptacle and in order to provide temperature modification a serpentine coil 14 is mounted on a header 15 attached by an outer hinge 16 to the base 10. The coil thus mounted may be located within and swung from and into the container or receptacle. The temperature modification may be by resistance heating through a resistance wire 17 extending through the coil 14 and into the header where it is joined to a conductor 18 extending to a source of electrical energy. Due to the coil 14 being fixed to the header 15 mounted by the piano hinge 16 on the base 10, the coil 14 can be swung from a generally horizontal position as clearly shown in FIGURE 2 to an upright position to afford free access to the receptacle 12.

Batter or other material 19 adapted to be subjected to temperature modification as for example to deep fat 20 in the receptacle 12 may be contained in a hopper 21 adapted to be mounted above the receptacle 12. The hopper is provided with a conical lower portion 22 terminating in a cylindrical neck 23 from which batter may be discharged into the receptacle 12 and the control of the discharge from the hopper may be in a well known manner.

Means are provided for supporting the hopper so that the cylindrical neck 23 may be moved over the length and breadth of the receptacle 12 for the distribution of the discharged material over the entire area of the receptacle. For this purpose a sleeve 24 is provided of a diameter slightly greater than the neck 23 of the hopper so that such neck may fit loosely in such sleeve and such sleeve is provided with forward and rear arms 25 and 26 (FIGURE 1) the forward arms having outward turned extremities 27 with openings 28 and the rear arms 26 having openings 29. The forward and rear arms 25 and 26 are slidably received upon a pair of spaced parallel bars 30 fixed at their rear to a yoke 31 having ends 32 with bifurcations 33 in which is disposed a traverse rod 34 mounted by supports 35 one at each end of the header and fixed to the header 15. The bifurcations 33 permit the yoke 31 to slide on the bar 34 beyond the support 35 with the support 35 passing through the bifurcations of the yoke. The traverse rod 34 extends beyond the header so that the yoke 31 can slide with the parallel bars 30 out to one end of the header and the base. The parallel bars 30 are connected at their ends to a plate or member 36 supported by rollers 37 on the forward portion of the base. This construction permits the sleeve 24 to be moved throughout the length and breadth of the pan so that the lower end of the hopper supported therein may be moved to distribute the batter over the area of the receptacle.

In FIGURE 3 the traverse rod 34 instead of being connected directly to the hopper by the members 35 is supported by spaced posts 38 having feet 39 secured by the bolts 40 to the floor 41.

The device may be provided with suitable indicating means as for example a red lamp 42 to indicate whether current is on or the temperature modification means is operating and also a control 43 with a dial may be provided so that the modification of temperature may be accomplished.

It will be apparent from the foregoing that a simple inexpensive device may be provided for cooking doughnuts or for subjecting other articles to temperature modification and that the device is of a construction that permits ready access to the receptacle to be had and the temperature modification coil readily removed to facilitate such access.

It will be obvious to those skilled in the art that various changes may be made in the invention without departing from the spirit and scope thereof and therefore the invention is not limited by that which is illustrated in the drawing and described in the specification but only as indicated in the accompanying claims.

What is claimed is:

1. A device for holding and subjecting material to temperature modification comprising a base having a space for the reception of a receptacle, a temperature modification coil having a portion constructed to be located within said space for modifying the temperature therein, a support for said coil pivoted horizontally to said base in a manner that said support and coil can be swung upwardly to a remote position clear of the area above said space, a hopper mounting means above said space, means for supporting said hopper mounting means from opposite sides of said space from said first mentioned support on one side and from said base on the opposite side whereby said hopper mounting means can be moved to and fro and from side to side above said coil and said space, said means for supporting said hopper mounting means being movable sidewise beyond and clear of said base to permit free and unobstructed access to said space.

2. A device for holding and subjecting material to temperature modification comprising a container, a header pivoted on said container, temperature modification means carried by said header in a manner to be disposed within said container when the header is in one position and exteriorly of said container when said header is in an opposite position, hopper mounting means, spaced means for supporting said hopper mounting means from opposite sides of said container for movement between said sides, and means for supporting said hopper mounting means on said spaced means whereby said hopper mounting means can be moved to and fro and from side to side above said container in operative relation above said container.

3. The structure of claim 2 in which said means for supporting said hopper mounting means on said spaced means includes parallel bars and supporting arms.

4. The structure of claim 2 in which said spaced means for supporting the hopper mounting means includes a horizontal bar, a pair of lateral members mounting said bar and a yoke slideable on said bar and having bifurcations which permit the yoke to slide beyond said lateral members.

5. The structure of claim 2 including means for controlling the temperature of said temperature modification means.

References Cited in the file of this patent
UNITED STATES PATENTS

| | | |
|---|---|---|
| 276,096 | Thomas | Apr. 17, 1883 |
| 1,212,860 | Wettengel | Jan. 16, 1917 |
| 2,229,167 | Carpenter | Jan. 21, 1941 |
| 2,742,000 | Hansen et al. | Apr. 17, 1956 |
| 2,794,897 | Giles | June 4, 1957 |
| 2,805,314 | Michaelis | Sept. 3, 1957 |